US008725970B2

(12) United States Patent
Li et al.

(10) Patent No.: US 8,725,970 B2
(45) Date of Patent: May 13, 2014

(54) SYSTEM AND METHOD FOR BACKING UP DATA

(75) Inventors: Hui Li, BeiJing (CN); Paul P. Ignatius, North Grafton, MA (US); Sarad Thapa, Commack, NY (US)

(73) Assignee: CA, Inc., Islandia, NY (US)

( * ) Notice: Subject to any disclaimer, the term of this patent is extended or adjusted under 35 U.S.C. 154(b) by 371 days.

(21) Appl. No.: 13/215,956

(22) Filed: Aug. 23, 2011

(65) Prior Publication Data
US 2013/0054909 A1 Feb. 28, 2013

(51) Int. Cl.
G06F 12/00 (2006.01)
G06F 13/00 (2006.01)
G06F 13/28 (2006.01)
G06F 7/00 (2006.01)
G06F 17/00 (2006.01)

(52) U.S. Cl.
USPC ............ 711/162; 707/640; 707/665; 707/667

(58) Field of Classification Search
USPC ........... 711/161–162; 707/640–653, 665–671
See application file for complete search history.

(56) References Cited

U.S. PATENT DOCUMENTS

2003/0145179 A1* 7/2003 Gabber et al. ................ 711/162
2006/0080371 A1* 4/2006 Wong et al. .................. 707/204
2006/0259724 A1* 11/2006 Saika ............................ 711/162
2010/0306486 A1* 12/2010 Balasubramanian et al. 711/162
2010/0312752 A1* 12/2010 Zeis et al. ..................... 707/640
2010/0332453 A1* 12/2010 Prahlad et al. ................ 707/640
2011/0131185 A1* 6/2011 Kirshenbaum ............... 707/654

OTHER PUBLICATIONS

Remote backup service—Wikipedia, the free encyclopedia, http://en.wikipedia.org/wiki/Remote_backup_service (5 pgs), Jul. 26, 2010.
Free-Backup.info—Free backup software, discussion and general information overload, http://free-backup.info/what-is-an-online-backup.html (4 pgs), May 9, 2010.
Data Deposit Box, © 2002-2009, So Simple, So Smart™, Easy-to-Use data backup http://www.datadepositbox.com/index.php/easy-to-use/ (1 pg), May 9, 2010.
What is Online Data Backup?, http://www.spamlaws.com/online-backup.html (2 pgs), Apr. 29, 2010.
CA ARCserve, From Wikipedia, the free encyclopedia. http://en.wikipedia.org/wiki/CA_ARCserve (7 pgs), Last modified Feb. 12, 2012.

* cited by examiner

*Primary Examiner* — Ryan Bertram
(74) *Attorney, Agent, or Firm* — Baker Botts, L.L.P.

(57) ABSTRACT

In accordance with one embodiment of the present disclosure, a method includes receiving second information about second data stored on a second device. The method also includes determining that the second data is associated with first data stored on a first device. The method further includes, based on the determination about the second data, associating the second data with a policy for backing up a particular type of data. The method further includes initiating a transfer of one or more copies of the second data to a second one or more storage medias defined by the policy.

25 Claims, 2 Drawing Sheets

SYSTEM AND METHOD FOR BACKING UP DATA

TECHNICAL FIELD

The present disclosure relates generally to backing up data.

BACKGROUND

Typically, backing up data may allow a copy of data to be saved as a backup in order to prevent the data from being lost if the original data is deleted or destroyed. Furthermore, backing up data may further allow a copy of data to be saved as a backup in order to comply with various laws and regulations. Typical data back up systems and methods, however, are deficient because some data may never be selected to be included in a backup procedure.

SUMMARY

In accordance with one embodiment of the present disclosure, a method includes receiving second information about second data stored on a second device. The method also includes determining that the second data is associated with first data stored on a first device. The method further includes, based on the determination about the second data, associating the second data with a policy for backing up a particular type of data. The method further includes initiating a transfer of one or more copies of the second data to a second one or more storage medias defined by the policy.

Numerous technical advantages are provided according to various embodiments of the present disclosure. Particular embodiments of the disclosure may exhibit none, some, or all of the following advantages depending on the implementation. In certain embodiments, second data may be associated with a policy for backing up data based on a determination that the second data is associated with first data. As such, the second data may be backed up based on its association with the first data. Therefore, the second data may be backed up even if the second data is, for example, modified, saved under a different designation, marked as not needing to be backed up, or is not actively associated with the policy. Furthermore, the second data may be backed up if it is a modified version of the first data.

In further embodiments, a first device may be associated with the policy for backing up data. As such, the policy may be enforced with regard to the first device so that it can be determined whether other data stored on the first device is also to be associated with the policy.

In further embodiments, the association of the first data with the policy for backing up data may be based on first metadata from the first data. As such, the first data does not need to be actively selected for backing up. Instead, it may be determined by analyzing the first metadata.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following descriptions, taken in conjunction with the accompanying drawings, in which.

DETAILED DESCRIPTION OF EXAMPLE EMBODIMENTS

Figure 1:
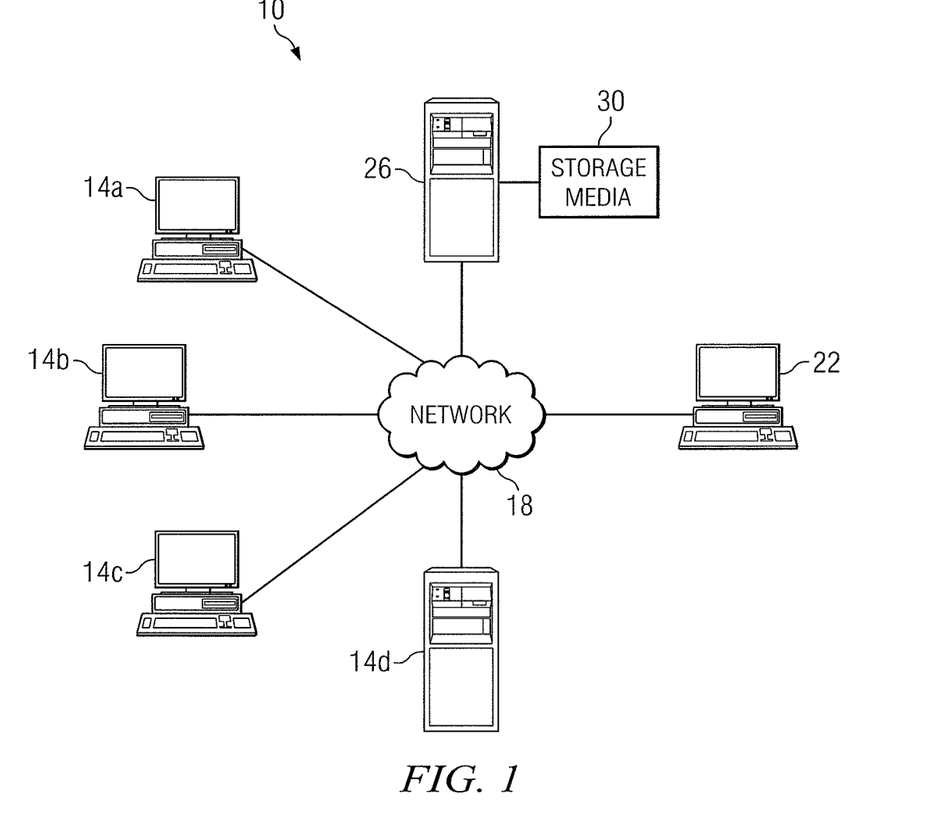
FIG. 1 illustrates an example system for backing up data.
Figure 2:
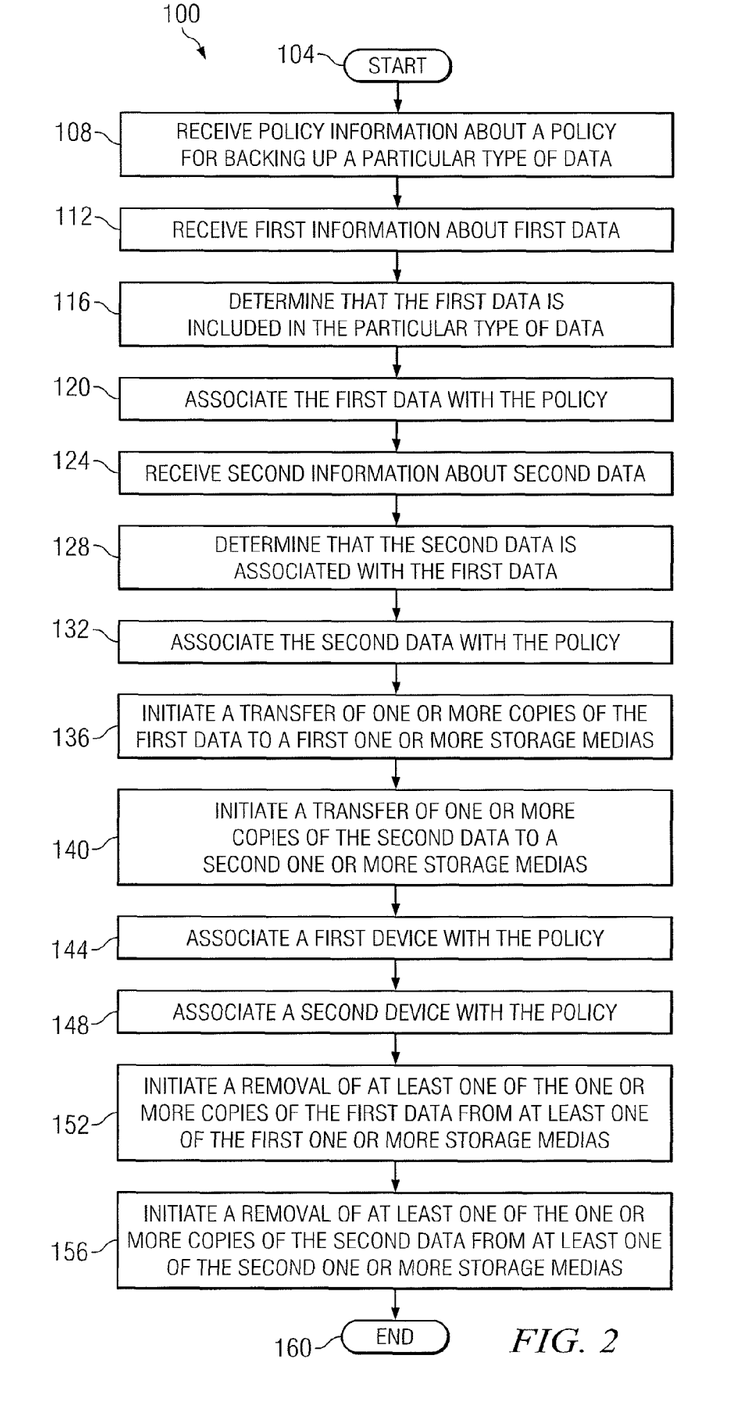
FIG. 2 illustrates an example method for backing up data.

Embodiments of the present invention and its advantages are best understood by referring to FIGS. 1 through 2 of the drawings, like numerals being used for like and corresponding parts of the various drawings.

FIG. 1 illustrates an example system 10 for backing up data. System 10 includes a backup management device 26 connected to one or more end user devices 14 through a network 18. In one embodiment, the backup management device 26 may associate first data stored on an end user device 14 with a policy, and manage a backup procedure of a copy of the first data based on that policy. Furthermore, the backup management device 26 may determine an association of second data stored on another end user device 14 with the first data, associate the second data with the policy, and manage the backup procedure of a copy of the second data based on that policy. In one embodiment, this may allow the second data to be backed up based on its association with the first data. For example, if a particular document is stored on two end user devices and the first copy of the document is associated with the policy, the second copy of the document may also be associated with the policy. As such, the second copy of the document may be backed up according to the policy even if the second document is, for example, modified, saved under a different designation, marked as not needing to be backed up, or is not actively associated with the policy.

According to the illustrated embodiment, the system 10 includes the end user devices 14, a network 18, an input device 22, the backup management device 26, and a storage media 30.

The end user devices 14 may store data. Data may refer to any suitable collection of numbers, symbols, characters, images, or other outputs from a device. For example, data may include a telephone number, one or more sentences, an e-mail, a document, a picture, character based data, binary based data, any other suitable data, or any combination of two or more of these.

An end user device 14 may refer to any suitable device for storing data. For example, the end user device 14 may include a desktop computer system, a laptop or notebook computer system, an interactive kiosk, a mainframe, a mesh of computer systems, a mobile telephone, a personal digital assistant (PDA), a server, or a combination of two or more of these. The end user devices 14 may each be the same type of device, or one or more of the end user devices 14 may be different types of devices. According to the illustrated embodiment, the end user devices 14a, 14b, and 14c may each include a computer that may store data and may further allow data to be accessed, created, modified, and/or deleted. For example, the end user devices 14a, 14b, and 14c may allow a user of the end user devices 14 to modify data. As another example, the end user devices 14 may further allow a user of the end user devices 14 to send data to another end user device 14. According to the illustrated embodiment, the end user device 14d may include a server, such as a data server or a database server, that may provide additional storage for data. For example, the end user device 14d may store data that may be accessed by each of the end user devices 14a, 14b, and 14c over the network 18. As such, data may be created, modified, and/or deleted at the end user device 14a, and any changes to that data may be stored on the end user device 14d. Accordingly, the changes to the data may be accessed by each of the end user devices 14a, 14b, and 14c. In a further embodiment, only certain changes to the data may be stored in the end user device 14d. For example, a user may make a first set of changes to data, and then store those changes on end user device 14d. After the first set of changes are made, the user may make a second set of changes that are only stored on, for example, end user device 14a. As such, there may be two different versions of the data, and some of the end user devices 14 may not have access to both versions.

Although FIG. 1 illustrates four end user devices 14, the system 10 may include any suitable number of the end user devices 14. For example, the system 10 may include more than four end user devices 14, or less than four end user devices 14.

The end user devices 14 may each have one or more backup agents (not shown) installed on the end user devices 14. A backup agent may refer to any suitable software that may allow data stored on an end user device 14 to be backed up. The backup agent may perform any suitable task for backing up the data stored on the end user device 14. For example, the backup agent may search for all of the data stored on the end user device 14, keep track of any changes made to the data stored on the end user device 14, copy any information about the data (i.e., such as metadata from the data) stored on the end user device 14, copy any of the data stored on the end user device 14, transfer the copy of the information about the data over the network 18, transfer the copy of the data over the network 18 for storage as a backup, encrypt the copy of the data prior to transferring the copy over the network 18 for storage as a backup, receive one or more signals from the backup management device 26 over the network 18, respond to any of the signals received from the backup management device 26, perform any other suitable task for a back up procedure, or any combination of two or more of these.

In one embodiment, the backup agents may perform one or more of the tasks for a backup procedure after the backup agents receive an activation signal from the backup management device 26. For example, at a prescheduled time, an activation signal may be sent to a backup agents installed on the end user device 14 from the backup management device 26, causing the backup agents to begin performing tasks for the backup procedure. In another embodiment, the backup agents may perform one or more of the tasks for a backup procedure without receiving any kind of signal. For example, the backup agents may include programming that causes them to begin performing one or more tasks without being prompted. In such an example, the backup agents may include schedules in their programming. As such, the backup agents may follow the schedule unless otherwise prompted, or unless the schedule is changed by, for example, the backup management device 26. As another example, the backup agents may be always performing one or more of their tasks. In a further embodiment, the backup agents may perform one or more tasks for a backup procedure after the backup agent receives a signal from an end user of an end user device 14. For example, an end user may activate a backup procedure by signaling the backup agent installed on the end user device 14. In one embodiment, such a signal from the end user may include any suitable information regarding the backup procedure, such as an indication of what data should be backed up, where the data should be backed up from, and where the data should be backed up to.

As is discussed above, the backup agents are installed on the end user devices 14. The backup agents may be installed on the end user devices 14 in any suitable manner. For example, the backup agents may be sent to the end user devices 14 over a network, installed on the end user devices 14 using any suitable computer readable medium (such as an optical disk or a floppy disk), installed on the end user devices 14 from the Internet, remotely installed on the end user devices 14 from the backup management device 26, such as through virtual network computing (VNC®), or automatically installed on the end user devices 14 by any suitable device, such as the backup management device 26.

The network 18 may connect the end user devices 14 to the backup management device 26, transporting one or more signals to and from the end user devices 14 and the backup management device 26. The network 18 may refer to any interconnecting system capable of transmitting audio, video, signals, data, messages, or any combination of the preceding. The network 18 may comprise all or a portion of a server backplane, a high-speed switch fabric, a public switched telephone network (PSTN), a public or private data network, a local area network (LAN), a metropolitan area network (MAN), a wide area network (WAN), a local, regional, or global communication or computer network such as the Internet, wireline or wireless network, and enterprise intranet, other suitable communication link, or any combination of two or more of these. In one embodiment, the network 18 may comprise all or a portion of a Storage Area Network (SAN) or Network Attached Storage (NAS). In one embodiment, the network may further connect the end user devices 14 and the backup management device 26 to the input device 22 and/or the storage media 30. As such, the network 18 may transport one or more signals to and from the end user devices 14, the input device 22, the backup management device 26, and/or the storage media 30.

The input device 22 may receive information for backing up data stored on the end user devices 14. The input device 22 may refer to any suitable device for receiving information regarding the backup procedure, and further for transferring the information to the backup management device 26. For example, the input device 22 may include a desktop computer system, a laptop or notebook computer system, an interactive kiosk, a mainframe, a mesh of computer systems, a mobile telephone, a personal digital assistant (PDA), a server, or a combination of two or more of these.

In one embodiment, the input device 22 may allow a user of the input device 22 to provide information regarding a policy for a backup procedure. A policy for a backup procedure may refer to any suitable rule or principle for a backup procedure: For example, a policy for a backup procedure may be to back up a particular type of data. In such an example, a particular type of data may include legal data, data associated with compliance or non-compliance with particular laws, regulations, or procedures (i.e., such as Sarbanes-Oxley, health laws, litigation holds), confidential data, top secret data, data marked for backup, data stored on particular end user devices 14, and/or all data stored or received at one or more end user devices 14. As another example, a policy for a backup procedure may be to make a particular number of copies of the data, to store the copies of the data in particular types of storage medias 30, to store the copies of the data in a particular location of the storage medias 30, to store the storage medias 30 in a particular location, to store the copies of the data as back ups for a particular duration of time, to conduct a removal procedure of the copies of the data after a particular duration of time, to allow or deny access to the copies of the data by particular people, to activate the backup procedure in accordance with a particular schedule (i.e., such as activate the backup procedure immediately, every three days, every 9:00 P.M. on every Tuesday of a week, or any other suitable timeframe and/or schedule), to conduct a particular type of backup procedure for each backup (i.e., such as a full plus incremental backup, a differential backup, a continuous data protection backup, or any other suitable type of backup), to perform any other suitable actions in accordance with a policy, or any combination of two or more of these.

A policy may be created in any suitable way. For example, the policy may be created based on information provided by an end user, a user of input device, any other suitable user or device, or a combination of two or more of these. In particular, an end user may provide an indication of what data should be backed up, and this indication may be used to create a policy. An end user may refer to one or more persons that access data stored at an end user device, such as end user devices 14, on a regular basis. For example, an end user may be an employee of a company whose job includes viewing, using, creating, and/or modifying data stored on the end user devices of the company. Because the end user accesses the data on a regular basis, the end user may be in the best position to determine which parts of the data should be backed up. Furthermore, the end user may be in the best position to also determine where the data to be backed up is stored, how recent changes in the company (such as the purchase of new end user devices or the hiring of new employees) has affected what data needs to be backed up, or any other suitable determination regarding the stored data. Therefore, by allowing the end user to provide the indication of what data should be backed up, a policy may be more easily and more accurately created. Furthermore, the policy may provide for backing up the most important data.

In one embodiment, the indication of what data should be backed up may be received by a user of an input device, such as the input device 22. A user of the input device may refer to one or more persons that do not regularly access the substance of the data, but who regularly manage the backing up of the data. For example, the user of the input device may be an information technology (IT) employee who only accesses the stored data when there is a problem with the devices storing the data, but who also manages the backup of the data. As such, although the user of the input device may not be in a good position to determine what data should be backed up, the user of the input device may have to create the policy and manage a backup procedure. Accordingly, the indication of what data should be backed up may allow the user of the input device to create and manage a better backup procedure.

In one embodiment, the indication of what data should be backed up may be sent and received in any suitable manner. For example, the indication may be sent by an end user to the user of the input device through an instant message, an email, a text, a letter, a note, a telephone call, or any other suitable means of communication, such as over any suitable social network. In a further embodiment, the indication may be provided to the backup agents installed on an end user device. In such an embodiment, the backup agents may send the indication to the input device for retrieval or access by the user of the input device.

In one embodiment, the user of the input device may use the indication from the end user in order to create the policy. For example, the user of the input device may use the indication to decide where the data should be stored (such as what type of storage medias 30 should be used for storing the data, which particular storage medias 30 should be used for storing a particular type of data, or how may of the storage medias 30 should be used to store the data). As another example, the user of the input device may use the indication to decide what type of backup procedure should be used (such as a full plus incremental backup, a differential backup procedure, or a continuous data protection backup). As another example, the user of the input device may use the indication to decide when the backup procedure of the policy should occur (such as prescheduling the backup procedure to occur at 9:00 P.M. on every Tuesday of a week). Accordingly, the user of the input device may create a policy for backing up a particular type of data. In a further embodiment, the policy may be created in any other suitable way (such as based on various laws and regulations, or based on a selection of data provided by any other suitable user or device), and may be created by any other suitable user or device.

Information regarding a policy for a backup procedure may refer to any suitable information needed to perform one or more actions in accordance with the policy. For example, the information may include a selection of the type of data to include in a policy (such as the selection provided by the end user, as is discussed above, or by any other user), the number of copies of the data to be made, the type of storage medias where the copies of the data will be stored, the location where the copies of the data will be stored in the storage medias, the location of the storage medias, the duration of time for storing the copies of the data, the removal procedure of the copies of the data, the access policy for the copies of the data, the schedule for activating each backup procedure for the policy, the type of backup procedure to use for each backup, any other suitable information regarding the policy for the backup procedure, or any combination of two or more of these.

In one embodiment, the input device 22 may further transfer information regarding the policy to the backup management device 26. For example, the input device 22 may transfer any suitable amount of the information to the backup management device 26 in order to allow the backup management device 26 to manage the backup procedure in accordance with the policy. In another embodiment, the input device 22 may further transfer information regarding the policy to the backup agents installed on the end user devices 14.

Although FIG. 1 illustrates only a single input device 22, the system 10 may include any suitable number of input devices 22. For example, the system 10 may include more than one input device 22. In such an example, the backup management device 26 may receive the information regarding the policy from one or more of the multiple input devices 22.

The backup management device 26 may manage the backup procedure for data stored on the end user devices 14. The backup management device 26 may refer to any suitable device for analyzing data and sending signals to other devices. For example, the backup management device 26 may include a desktop computer system, a laptop or notebook computer system, an interactive kiosk, a mainframe, a mesh of computer systems, a mobile telephone, a personal digital assistant (PDA), a server, or a combination of two or more of these. The backup management device 26 may perform any suitable tasks for managing a backup procedure according to a policy. For example, the backup management device 26 may receive information about a policy, determine the type of data that is included in the policy, receive information about data stored on the end user devices 14, analyze the information to determine whether the data is included in the type of data of the policy, associate the data with the policy, and initiate the transfer of copies of the data to the storage medias 30. As a further example, the backup management device 26 may receive information about data that is stored on other end user devices 14, analyze the information to determine whether the data is associated with other data, associate the data with the policy, and initiate the transfer of copies of the data to the storage medias 30. As an additional example, the backup management device may associate a device with the policy, initiate a removal of one or more copies of the data from one or more storage medias 30, or perform any other suitable task for managing a backup procedure according to a policy.

The backup management device 26 may further perform any suitable task for storing a copy of the data. For example, the backup management device 26 may compress the copy of the data for storage, encrypt the copy of the data prior to storage, de-dupe the copy of the data, manipulate the copy of the data in any suitable manner, or any combination of two or more of these. The backup management device 26 may further transfer the copy of the data to the storage media 30, thereby allowing the storage media 30 to store the copy of the data.

According to a further embodiment, the backup management device 26 may further provide for restoring the copy of the data to the end user devices 14. For example, if data stored on the end user devices 14 is damaged, corrupted, lost, and/or deleted, the backup management device 26 may provide the copy of the data to the end user devices 14. For example, the backup agents installed on the end user devices 14 may transmit a signal to the backup management device 26 that indicates what data needs to be restored. Accordingly, the backup management device 26 may communicate with the storage media 30 in order to find the copy of the data and also to transmit the copy of the data to the end user devices 14. For example, communicating with the storage media 30 may cause the storage media 30 to transmit the copy of the data directly to the end user devices 14, or transmit the copy of the data to the backup management device 26 for transmittal to the end user devices 14. Accordingly, the end user devices 14 may receive the copy of the data.

Although FIG. 1 illustrates only a single backup management device 26, the system 10 may include any suitable number of backup management devices 26. For example, the system 10 may include more than one backup management device 26. Furthermore, although FIG. 1 illustrates the backup management device 26 and the input device 22 as separate devices, the backup management device 26 and the input device 22 may be a single device. As such, the information about the policy may be input into the same device that manages the backup procedure.

In one embodiment, one or more tasks of the back management device 26 may be performed by the backup agents installed on the end user devices 24. For example, the backup agents installed on each of the end user devices 14 may manage the backup procedure for the data stored on each of the end user devices 14. In such an example, the backup management device 26 may merely assist in coordinating the tasks of each of the backup agents. Furthermore, as another example, the system 10 may not include a backup management device 26 at all. In such an example, one or more of the backup agents installed on one or more end user devices 14 may coordinate the tasks of each of the backup agents, or each of the backup agents may communicate with each other in order to coordinate their tasks.

The storage media 30 may store a copy of data as a backup. The storage media 30 may refer to any suitable storage device. For example, the storage media 30 may include a magnetic tape, a hard disk (such as the hard drive of a computer or a server), an optical disk, a floppy disk, a solid state storage device (such as flash memory or a universal serial bus (USB) flash drive), any other suitable storage device, or any combination of two or more of these. In one embodiment, the type and number of storage medias 30 used to store a copy of data may be based on the copy of data. For example, if the copy includes a small amount of data, a smaller number of storage medias 30 may be used, or storage medias 30 with a smaller amount of storage capacity may be used. As another example, if the copy includes a large amount of data, a larger number of storage medias 30 may be used, or storage medias with a higher capacity of storage may be used.

According to the illustrated embodiment, the storage media 30 may receive the copy of the data from the backup management device 26. In one embodiment, after receiving the copy of the data, the media storage 30 may be relocated. For example, after the storage media 30 receives and stores the copy of the data, the storage media may be disconnected from the backup management device 26 or the network 18 and moved offsite (or to any other location) for a more permanent storage. As such, the copy of the data may be stored in a safer and/or different location than the original data. Accordingly, if the original data is destroyed in an accident, such as a fire, the copy of the data may still be safely stored.

According to the illustrated embodiment, the storage media 30 is connected to the backup management device 26. The storage media 30 may be connected to the backup management device 26 in any suitable manner. For example, the storage media 30 may be connected directly to the backup management device 26 through one or more cables, one or more wires, or any other suitable connectors. As another example, the storage media 30 may be connected to the backup management device 26 through any suitable network for transporting signals to and from the storage media 30 and the storage management device 26, such as a WAN, LAN, or any other suitable network. Furthermore, although FIG. 1 illustrates the storage media 30 connected directly to the backup management device 26, in a further embodiment, the storage media 30 may be connected to the backup management device 26 (and the end user devices 14) through the network 18. Furthermore, in another embodiment, the storage media 30 may be connected to the end user devices 14 instead of the backup management device 26.

Although FIG. 1 illustrates only a single storage media 30, the system 10 may include any suitable number of storage medias 30. For example, the system 10 may include more than one storage media 30. Furthermore, although FIG. 1 illustrates the storage media 30 and the backup management device 26 as separate devices, the storage media 30 and the backup management device 26 may be the same device. As such, the backup procedure may be activated by the same device that stores the copy of the data as a backup.

Modifications, additions, or omissions may be made to the system 10 without departing from the scope of the invention. The components of the system 10 may be integrated or separated. Moreover, the operations of the system 10 may be performed by more, fewer, or other components. For example, the operations of the backup management device 26 may be performed by other components, such as the backup agents installed on the end user devices 14.

FIG. 2 illustrates an example method 100 for backing up data. In one embodiment, the method may be performed by the backup management device 26 of FIG. 1. In a further embodiment, the method may be performed by one or more backup agents installed on the end user devices 14 of FIG. 1. In another embodiment, one or more steps of the method may be performed by a first device, and the remaining steps may performed by one or more other devices. For example, one or more steps of the method may be performed by the backup management device 26 of FIG. 1, and the other steps of the method may be performed by one or more backup agents installed on the end user devices 14 of FIG. 1.

The method 100 begins at step 104. At step 108, information about a policy for backing up a particular type of data is received. As is discussed above, information regarding a policy for backing up data may refer to any suitable information needed to perform one or more actions in accordance with the policy. For example, information may include a selection of a type of data to include in the policy. Furthermore, a policy for backing up a particular type of data may refer to any suitable rule or principle for a backup procedure. For example, a policy for a backup procedure may be to back up a particular type of data at a predetermined time and store the backup for a predetermined amount of time.

In one embodiment, the information may be received by the backup management device 26. For example, the information may be input by a user into the input device 22, and the information may be transferred to the backup management device 26. As a further example, the information may be input directly into the backup management device 26. In a further embodiment, the information may be received by one or more agents installed on the end user devices 14.

In one embodiment, the receipt of the information may be caused by the creation of a particular policy. For example, after a policy is created (such as by inputting information into the input device 22 or the backup management device 26), the information may be immediately received, or may be received at any other suitable time, such as a prescheduled time.

At step 112, first information about first data is received. In one embodiment, the first data may include any suitable data stored on a first device. For example, the first data may include a telephone number, one or more sentences, an e-mail, a document, a picture, character based data, binary based data, any other suitable data, or any combination of two or more of these. In one embodiment, the first information about the first data may include any suitable information about the first data. For example, the first information may include metadata from the first data In a further embodiment, the first information may include any other suitable information that may allow the first data to be identified. For example, the first information may allow the first data to be identified as a particular type of data, such as legal data. In a further embodiment, the first information may allow the first data to be identified as a modification of a prior version of the first data. For example, the first information may allow a document stored on a device as first data to be identified as a modification of a prior version of the document.

In one embodiment, the first information may be received at any suitable time. For example, the first information may be received when a user selects the first data for a backup procedure, when the user saves the first data on the first device, when the first data is transmitted to (or from) the first device, when a backup agent is installed on the first device, at one or more prescheduled times after the backup agent is installed on the first device, when the backup agent receives a signal (i.e., such as from the backup management device 26), when the first device is not currently being used by a user, any other suitable time, or any combination of two or more of these.

In one embodiment, the first information is received at the backup management device 26. For example, a first backup agent installed on the first device may monitor the first device in order to determine what should be included in the first information, and then may subsequently transfer the first information to the backup management device 26. In another embodiment, the first information is received at the backup agents installed on the first device. For example, by monitoring the first device, the backup agents may receive the first information.

At step 116, the first data is determined to be included in the particular type of data. In one embodiment, the first data may be determined to be included in the particular type of data when the first data is the same type of data as the particular type of data. For example, if the particular type of data for the policy is legal data, the first data may be determined to be included in the particular type of data if the first data is also legal data.

In one embodiment, the determination that the first data is included in the particular type of data is based on the first information. For example, in an embodiment where the first information includes metadata, the metadata may be used to determine that the first data is included in the particular type of data. In such an example, the metadata may be used to determine that the first data is, as one example, legal data.

In one embodiment, the determination that the first data is included in the particular type of data may modify or change any previous designation of the first data. For example, in one embodiment, a user may have previously designated the first data (i.e., such as by saving it under a particular designation) as non-legal data even though it is legal data. However, the determination that the first data is included in the particular type of data may cause that designation to change to the new designation (i.e., change the designation from non-legal data to legal data, or from non-legal data to any other type of data). As such, the determination may change a previous designation. In a further embodiment, the determination may not change the previous designation. For example, the determination may cause the first data to be designated both as the previous designation and also as the new designation (i.e., the first data may be designated as both non-legal data and legal data). As such, the first data may still have the previous designation.

At step 120, the first data is associated with the policy. In one embodiment, by associating the first data with the policy, the first data may now be backed up in accordance with the policy. For example, when the first data is associated with a policy that legal data is to be backed up every three days, the first data may now be backed up every three days. In one embodiment, the association of the first data with the policy may modify or change any previous association of the first data. For example, in one embodiment, a user may have previously associated the first data with a policy regarding non-legal data even though it is legal data. However, by associating the first data with the policy, the association of the first data may be changed to a different policy (i.e., change the association from a policy regarding non-legal data to a policy regarding legal data, or from a policy regarding non-legal data to a policy regarding any other type of data). As such, the association may change a previous association. In a further embodiment, the association may not change the previous association. For example, the association may cause the first data to be associated with both the previous policy and also with the new policy (i.e., the first data may be associated with both a policy for non-legal data and a policy for legal data). As such, the first data may still have the previous association.

In one embodiment, the association of the first data with the policy may cause the association of the first data to be automatically changed when a policy is changed or updated. For example, if a new law causes a policy to be changed, the association of the first data with the policy may cause the first data to be automatically changed to the new policy. As such, there may not be a need to manually update or change associations each time a policy changes.

In one embodiment, the association of the first data with the policy may be made based on the determination about the first data. For example, in an embodiment where there is a policy for backing up legal data about a particular litigation, the first data may be associated with this policy based on the determination that the first data is included in legal data about the particular litigation.

At step 124, second information about second data is received. In one embodiment, the second data may be any suitable data stored on a second device. For example, in one embodiment the second data may be data stored on a second device such as end user device 14d of FIG. 1, while the first data may be data stored on a first device such as end user device 14a of FIG. 1. In one embodiment, the second data may include any suitable data stored on a second device. For example, the second data may include a telephone number, one or more sentences, an e-mail, a document, a picture, character based data, binary based data, any other suitable data, or any combination of two or more of these. In one embodiment, the second information about the second data may include any suitable information about the second data. For example, the second information may include metadata from the second data. In a further embodiment, the second information may include any other suitable information that may allow the second data to be identified. For example, the second information may allow the second data to be identified as a particular type of data, such as legal data. In a further embodiment, the second information may allow the second data to be identified as a modification of a prior version of the second data. For example, the second information may allow a document stored on a device as second data to be identified as a modification of a prior version of the document.

In one embodiment, the second information is received at the backup management device 26. For example, a second backup agent installed on the second device may monitor the second device in order to determine what should be included in the second information, and then may subsequently transfer the second information to the backup management device 26. In another embodiment, the second information is received at the backup agents installed on the second device. For example, by monitoring the second device, the backup agents may receive the second information.

In one embodiment, the second information may be received at any suitable time. For example, the second information may be received when a user selects the second data for a backup procedure, when the user saves the second data on the second device, when the second data is transmitted to (or from) the second device, when a backup agent is installed on the second device, at one or more prescheduled times after the backup agent is installed on the second device, when the backup agent receives a signal (i.e., such as from the backup management device 26), when the second device is not currently being used by a user, when it is determined that the first data on the first device was transmitted to the second device as second data (i.e., such as by analyzing information about the first data), any other suitable time, or any combination of two or more of these.

At step 128, the second data is determined to be associated with the first data. In one embodiment, the second data may be determined to be associated with the first data if the second data has any suitable connection to the first data. For example, the second data may be connected to the first data if the second data is a modified version of the first data. In particular, a first device may store the exact same data as a second device (i.e., such as when the same data is transmitted to both devices, or when the data is transmitted from the first device to the second device, or vice versa). Accordingly, a connection may exist between the first data and the second data. Furthermore, this connection may still exist even if the second data is later modified to be different from the first data (i.e., since they are both derived from identical data). As such, it may be determined that the second data is associated with the first data. As another example, the second data may be connected to the first data if the second data had anything to do with the first data. In particular, data stored on a first device may be transferred to a second device using some type of communication protocol, such as e-mail. Accordingly, the communication may be stored on the second device as second data. In such an example, a connection may exist between the first data (i.e., such as a document sent in the e-mail, or even a document merely referred to in the e-mail) and the second data (i.e., such as the e-mail received by the second device). As such, it may be determined that the second data is associated with the first data.

In one embodiment, the determination that the second data is associated with the first data is based on the second information. For example, in an embodiment where the second information includes metadata, the metadata may be used to determine that the second data is associated with the first data. In such an example, the metadata may be used to determine that the second data is connected to the first data in some way. In one embodiment, the second information may be analyzed in order to determine that the second data is included in the particular type of data. In a further embodiment, the determination that the second data is associated with the first data is also based on the first information. For example, in an embodiment where the first information and the second information include metadata, both sets of metadata may be analyzed in order to determine that the second data is associated with the first data.

In one embodiment, the determination that the second data is associated with the first data may modify or change any previous association of the second data. For example, in one embodiment, a user may have previously designated the second data (i.e., such as by saving it under a particular designation) as not being associated with the first data, even though it should be associated with the first data. However, the determination that the second data is associated with the first data may cause that designation to change so that the second data is now associated with the first data. As such, the determination may change a previous designation that was preventing the first data's association with the second data. In a further embodiment, the determination may not change the previous designation. For example, the determination may cause the second data to keep its previous designation, but may also cause the second data to now be associated with the first data. As such, the first data may still have the previous designation.

At step 132, the second data is associated with the policy. In one embodiment, by associating the second data with the policy, the second data may now be backed up in accordance with the policy. For example, when the second data is associated with a policy that legal data is to be backed up every three days, the second data may now be backed up every three days. In one embodiment, the association of the second data with the policy may modify or change any previous association of the second data. For example, in one embodiment, a user may have previously associated the second data with a policy regarding non-legal data even though it is legal data. However, by associating the second data with the policy, the association of the second data may be changed to a different policy (i.e., change the association from a policy regarding non-legal data to a policy regarding legal data, or from a policy regarding non-legal data to a policy regarding any other type of data). As such, the association may change a previous association. In a further embodiment, the association may not change the previous association. For example, the association may cause the second data to be associated with both the previous policy and also with the new policy (i.e., the second data may be associated with both a policy for non-legal data and a policy for legal data). As such, second data may still have the previous association.

In one embodiment, the association of the second data with the policy may cause the association of the second data to be automatically changed when a policy is changed or updated. For example, if a new law causes a policy to be changed, the association of the second data with the policy may cause the second data to be automatically changed to the new policy. As such, there may not be a need to manually update or change associations each time a policy changes.

In one embodiment, the association of the second data with the policy may be made based on the determination about the second data. For example, in an embodiment where there is a policy for backing up legal data about a particular litigation, the second data may be associated with this policy based on the determination that the second data is associated with the first data (i.e., since the first data has already been determined to be included in legal data about the particular litigation).

At step 136, a transfer of one or more copies of the first data is initiated. In one embodiment, the initiation of the transfer of the one or more copies of the first data may cause the one or more copies of the first data to be transferred to a first one or more storage medias. In one embodiment, the first one or more storage medias may include any suitable storage for the first data, such as the storage medias 30 of FIG. 1.

In one embodiment, the initiation of the transfer of one or more copies of the first data to the one or more storage medias may be based on the information about the policy. In such an embodiment, the initiation of the transfer of the one or more copies of the first data may be made in accordance with the policy. For example, the policy may require that the one or more copies of the first data be transferred to a storage media that is defined by the policy. In such an example, the copies may be transferred to a solid state storage drive for storage if such a storage media is required by the policy. Furthermore, the copies may be transferred to any storage media if no particular storage media is required by the policy. As another example, the policy may require that one or more copies of the first data be sent to one storage media, while also requiring that other copies of the first data be sent to other storage medias. In particular, a policy for legal data may require that a first copy of the data be transferred to a server for storage, while also requiring that a second copy of the data be transferred to a solid state storage drive for storage. As such, each copy of the data may be backed up at a different storage media. Accordingly, the backup of the data may be more secure.

In one embodiment, the transfer of the one or more copies of the first data may be initiated at any suitable time in accordance with the policy. For example, if the policy is that legal data is to be backed up every three days, the transfer of the one or more copies of the first data may be initiated every three days. Furthermore, if the policy does not require a particular time for the initiation of the transfer, the initiation may occur at any time that is still in accordance with the policy. As one example, if the policy is that legal data is to be backed up every three days, but there is no specific time for such an initiation, the initiation of the transfer may occur at any time during that third day. As such, the exact time of the initiation of transfer may be moved to accommodate devices that are busy, or to accommodate users who may be using that data during a scheduled backup procedure.

In one embodiment, the transfer of the one or more copies of the first data may be initiated by the backup management device 26. For example, the backup management device 26 may communicate with the one or more backup agents installed on the first device, causing the one or more backup agents to transfer the one or more copies of the first data, directly or indirectly, to the one or more storage medias. As another example, the backup management device 26, itself, may transfer the one or more copies of the first data, directly or indirectly, to the one or more storage medias. In such an example, the backup management device 26 may receive the one or more copies of the first data and subsequently transfer the one or more copies of the first data. In one embodiment, the backup management device 26 may receive the one or more copies of the first data at any suitable time. For example, the backup management device 26 may receive the one or more copies of the first data at the same time (or near the same time) that the backup management device 26 received the information about the first data. As such, the determination about the first data may be made while the backup management device 26 stores both the information about the first data, and the copies of the first data. As another example, the backup management device may not receive the one or more copies of the first data until any suitable time after the first data has been associated with the policy. In such an example, the backup management device may not receive the one or more copies until some predetermined time before the transfer is made to the one or more storage medias. As a result, the backup management device 26 may not have to store the copies of the first data for very long.

At step 140, a transfer of one or more copies of the second data is initiated. In one embodiment, the initiation of the transfer of the one or more copies of the second data may cause the one or more copies of the second data to be transferred to a second one or more storage medias. In one embodiment, the second one or more storage medias may include any suitable storage for the second data, such as the storage medias 30 of FIG. 1. In one embodiment, the second one or more storage medias may be the same as the first one or more storage medias. For example, in one embodiment, the copies of the first data and the copies of the second data may be transferred to the same storage media, such as a solid state storage device. In a further embodiment, the second one or more storage medias may be different from the first one or more storage medias. For example, in one embodiment, the copies of the first data may be transferred to a first storage media, such as a server, and the copies of the second data may be transferred to a second storage media, such as solid state storage device or a different server.

In one embodiment, the initiation of the transfer of one or more copies of the second data to the one or more storage medias may be based on the information about the policy. In such an embodiment, the initiation of the transfer of the one or more copies of the second data may be made in accordance with the policy. For example, the policy may require that the one or more copies of the second data be transferred to a storage media that is defined by the policy. In such an example, the copies may be transferred to a solid state storage drive for storage if such a storage media is required by the policy. Furthermore, the copies may be transferred to any storage media if no particular storage media is required by the policy. As another example, the policy may require that one or more copies of the second data be sent to one storage media, while also requiring that other copies of the second data be sent to other storage medias. In particular, a policy for legal data may require that a first copy of the legal data be transferred to a server for storage, while also requiring that a second copy of the legal data be transferred to a solid state storage drive for storage. As such, each copy of the data may be backed up at a different storage media. Accordingly, the backup of the second data may be more secure.

In one embodiment, the transfer of the one or more copies of the second data may be initiated at any suitable time in accordance with the policy. For example, if the policy is that legal data is to be backed up every three days, the transfer of the one or more copies of the second data may be initiated every three days. Furthermore, if the policy does not require a certain time for the initiation of the transfer, the initiation may occur at any time that is still in accordance with the policy. As one example, if the policy is that legal data is to be backed up every three days, but there is no specific time for such an initiation, the initiation of the transfer may occur at any time during that third day. As such, the exact time of the initiation of transfer may be moved to accommodate devices that are busy, or to accommodate users who may be using that data during a scheduled backup procedure.

In one embodiment, the transfer of the one or more copies of the second data may only be initiated when the second data is different from the first data. For example, if the second data is identical to the first data (i.e., such as they are the exact same document), a transfer of the one or more copies of the second data may not be initiated. In a further embodiment, the transfer of the one or more copies of the second data may still be initiated even when the second data is not different from the first data.

In one embodiment, the transfer of the one or more copies of the second data may be initiated by the backup management device 26. For example, the backup management device 26 may communicate with the one or more backup agents installed on the first device, causing the one or more backup agents to transfer the one or more copies of the second data, directly or indirectly, to the one or more storage medias. As another example, the backup management device 26, itself, may transfer the one or more copies of the second data, directly or indirectly, to the one or more storage medias. In such an example, the backup management device 26 may receive the one or more copies of the second data and subsequently transfer the one or more copies of the second data.

In one embodiment, the backup management device 26 may receive the one or more copies of the second data at any suitable time. For example, the backup management device 26 may receive the one or more copies of the second data at the same time (or near the same time) that the backup management device 26 received the information about the second data. As such, the determination about the second data may be made while the backup management device 26 stores both the information about the second data, and the copies of the second data. As another example, the backup management device 26 may not receive the one or more copies of the second data until any suitable time after the second data has been associated with the policy. In such an example, the backup management device 26 may not receive the one or more copies until some predetermined time before the transfer is made to the one or more storage medias. As a result, the backup management device 26 may not have to store the copies of the second data for very long.

At step 144, a first device is associated with the policy. In one embodiment, the association of the first device with the policy may be based on the determination about the first data. For example, when it is determined that the first device stores the first data (i.e. which has been determined to be included in the particular type of data for the policy, and has also been associated with the policy), it may also be determined that the first device is to be associated with the policy. In such an example, the reasoning behind such an association may be that since the first device includes first data that is associated with policy, the first device may include other data that also needs to be associated with the policy. In one embodiment, by associating the first device with the policy, the requirements of the policy may now be enforced with regard to the first device. For example, associating the first device with the policy may cause information about any other data stored on the first device to be received (i.e., such as by the backup management device 26 or one or more backup agents installed on the first device) so that it can be determined whether that other data is also to be associated with the policy (i.e., such as when the data is determined to be associated with the first data, or it is determined to be included in the particular type of data of the policy). As such, all of the other data on the first device that should be associated with the policy may be discovered and associated with the policy.

In one embodiment, the association of the other data with the policy may be similar to the association of the first data with the policy, or the association of the second data with the policy. For example, steps 112-120 and/or steps 124-132 of method 100 may be repeated for the other data stored on the first device. In one embodiment, once all of other the data on the first device that should be associated with the policy is discovered and associated with the policy, the other data may then be backed up in accordance with the policy. For example, step 136 and/or step 140 of method 100 may be repeated for the other data stored on the first device.

At step 148, a second device is associated with the policy. In one embodiment, the association of the second device with the policy may be based on the determination about the second data. For example, when it is determined that the second device stores the second data (i.e. which has been determined to be associated with the first data, and also been associated with the policy), it may also be determined that the second device is to be associated with the policy. In such an example, the reasoning behind such an association may be that since the second device includes second data that is associated with policy, the second device may include other data that also needs to be associated with the policy. In one embodiment, by associating the second device with the policy, the requirements of the policy may now be enforced with regard to the second device. For example, associating the second device with the policy may cause Information about any other data stored on the second device to be received (i.e., such as by the backup management device 26 or one or more backup agents installed on the first device) so that it can be determined whether that other data is also to be associated with the policy (i.e., such as when the data is determined to be associated with the first data, or it is determined to be included in the particular type of data of the policy). As such, all of the other data on the second device that should be associated with the policy may be discovered and associated with the policy.

In one embodiment, the association of the other data with the policy may be similar to the association of the first data with the policy, or the association of the second data with the policy. For example, steps 112-120 and/or steps 124-132 of method 100 may be repeated for the other data stored on the second device. In one embodiment, once all of other the data on the second device that should be associated with the policy is discovered and associated with the policy, the other data may then be backed up in accordance with the policy. For example, step 136 and/or step 140 of method 100 may be repeated for the other data stored on the second device.

At step 152, a removal of at least one of the one or more copies of the first data from at least one of the first one or more storage medias is initiated. In one embodiment, a removal of the at least one of the one or more copies may refer to any suitable type of removal. For example, the removal may include deleting the copies, overwriting the copies, or transferring the copies to somewhere else. In one embodiment, the initiation of the removal of the at least one of the one or more copies of the first data may be based on the information about the policy. For example, in one embodiment, the policy may require that a particular type of data only be stored for three months. As such, after a copy of the first data has been stored for three months, the removal of the first copy from the storage media may be performed. In one embodiment, the policy may have different backup requirements for different copies of the data. For example, the policy may require that two copies of the first data be backed up: one copy being backed up on a server for three months and the second copy being backed up on a solid state storage drive for three years. In such an embodiment, the initiation of the removal of the at least one of the one or more copies of the first data may include only initiating the removal of the copy from the server after three months. As such, the copy stored on the solid state storage drive may not be removed after only three months. Instead, it may only be removed after the three year requirement has been met.

In a further embodiment, the initiation of the removal of at least one of the one or more copies of the first data may allow for the removal of redundant information. For example, in one embodiment, a policy for backing up data may require a full data backup every one year, but may also require incremental data backups every month. In such an embodiment, a full copy of data may be backed up when the policy is initiated. After that, any modifications made to that data may be backed up each month. However, a year after the first full data backup was performed, a second full data backup may be performed again in accordance with the policy. Once such a second full data backup is performed, each of the previous incremental data backups (i.e., the incremental data backups that were performed each month) may now be redundant. As such, the initiation of the removal of the at least one of the one or more copies of the first data may include initiating the removal of each of the incremental data backups that were performed prior to the second full data backup.

In one embodiment, the removal of the at least one of the one or more copies of the first data from the at least one of the first one or more storage medias may be initiated by the backup management device 26. For example, the backup management device 26 may communicate with the storage media, or another device controlling the storage media, to cause the removal of the copies of the first data. In another embodiment, the removal of the at least one of the one or more copies of the first data from the at least one of the first one or more storage medias may be initiated by the one or more backup agents installed on the first device. For example, the backup agents may communicate with the storage media, or another device controlling the storage media, to cause the removal of the copies of the first data.

At step 156, a removal of at least one of the one or more copies of the second data from at least one of the second one or more storage medias is initiated. In one embodiment, a removal of the at least one of the one or more copies may refer to any suitable type of removal. For example, the removal may include deleting the copies, overwriting the copies, or transferring the copies to somewhere else. In one embodiment, the initiation of the removal of the at least one of the one or more copies of the second data may be based on the information about the policy. For example, in one embodiment, the policy may require that a particular type of data only be stored for three months. As such, after a copy of the second data has been stored for three months, the removal of the copy from the storage media may be performed. In one embodiment, the policy may have different backup requirements for different copies of the data. For example, the policy may require that two copies of the second data be backed up: one copy being backed up on a server for three months and the second copy being backed up on a solid state storage drive for three years. In such an embodiment, the initiation of the removal of the at least one of the one or more copies of the second data may include only initiating the removal of the copy from the server after three months. As such, the copy stored on the solid state storage drive may not be removed after only three months. Instead, it may only be removed after the three year requirement has been met.

In a further embodiment, the initiation of the removal of at least one of the one or more copies of the second data may allow for the removal of redundant information. For example, in one embodiment, a policy for backing up data may require a full data backup every one year, but may also require incremental data backups every month. In such an embodiment, a full copy of data may be backed up when the policy is initiated. After that, any modifications made to that data may be backed up each month. However, a year after the first full data backup was performed, a second full data backup may be performed again in accordance with the policy. Once such a second full data backup is performed, each of the previous incremental data backups (i.e., the incremental data backups that were performed each month) may now be redundant. As such, the initiation of the removal of the at least one of the one or more copies of the second data may include initiating the removal of each of the incremental data backups that were performed prior to the second full data backup.

In one embodiment, the removal of the at least one of the one or more copies of the second data from the at least one of the second one or more storage medias may be initiated by the backup management device 26. For example, the backup management device 26 may communicate with the storage media, or another device controlling the storage media, to cause the removal of the copies of the second data. In another embodiment, the removal of the at least one of the one or more copies of the second data from the at least one of the second one or more storage medias may be initiated by the one or more backup agents installed on the second device. For example, the backup agents may communicate with the storage media, or another device controlling the storage media, to cause the removal of the copies of the first data.

At step 160, the method ends. The steps illustrated in FIG. 2 may be combined, modified, or deleted where appropriate. Additional steps may also be added to the example operation. Furthermore, the described steps may be performed in any suitable order. Additionally, one or more of the steps may be performed at substantially the same time (or even the same time) as other steps illustrated.

Although the present disclosure has been described in several embodiments, a myriad of changes, substitutions, and modifications may be suggested to one skilled in the art, and it is intended that the present disclosure encompass such changes, substitutions, and modifications as fall within the scope of the present appended claims.

To aid the Patent Office and any readers of any patent issued on this application and interpreting the claims appended hereto, Applicants wish to note that they do not intend any of the appended claims to invoke Paragraph 6 of 35 U.S.C. §112 as it exists on the date of filing hereof unless "means for" or "step for" are used in the particular claim.

What is claimed is:

1. A method, comprising:
   receiving, by a backup management device, second information about second data stored on a second device;
   determining, by the backup management device, that the second data is associated with first data stored on a first device;

based on the determination about the second data, associating, by the backup management device, the second data with a policy for backing up a particular type of data, and initiating, by the backup management device, a transfer of one or more copies of the second data to a second one or more storage medias defined by the policy.

2. The method of claim 1, further comprising:

receiving, by the backup management device, information about the policy;

receiving, by the backup management device, first information about the first data;

determining, by the backup management device, that the first data is included in the particular type of data;

based on the determination about the first data, associating, by the backup management device, the first data with the policy; and initiating, by the backup management device, a transfer of one or more copies of the first data to a first one or more storage medias defined by the policy.

3. The method of claim 2, further comprising:

based on the determination about the first data, associating the first device with the policy; and based on the determination about the second data, associating the second device with the policy.

4. The method of claim 2, wherein the first one or more storage medias are the same as the second one or more storage medias.

5. The method of claim 1, wherein the determining that the second data is associated with the first data comprises determining that the first data and the second data comprise the same type of data.

6. The method of claim 2, wherein the first information is received from a first agent installed on the first device; and wherein the second information is received from a second agent installed on the second device.

7. The method of claim 2, wherein the first information comprises a copy of first metadata from the first data; and wherein the second information comprises a copy of second metadata from the second data.

8. The method of claim 2, wherein the initiating the transfer of the one or more copies of the first data to the first one or more storage medias defined by the policy comprises receiving the one or more copies of the first data and subsequently transferring the one or more copies of the first data to the first one or more storage medias; and wherein the initiating the transfer of the one or more copies of the second data to the second one or more storage medias defined by the policy comprises receiving the one or more copies of the second data and subsequently transferring the one or more copies of the second data to the second one or more storage medias.

9. The method of claim 2, further comprising:

based on the information about the policy, initiating a removal of at least one of the one or more copies of the first data from at least one of the first one or more storage medias after a first predetermined amount of time; and based on the information about the policy, initiating a removal of at least one of the one or more copies of the second data from at least one of the second one or more storage medias after a second predetermined amount of time.

10. A system, comprising:

a memory including instructions;

one or more processors operable, upon execution of the instructions, to:

receive second information about second data stored on a second device;

determine that the second data is associated with first data stored on a first device;

based on the determination about the second data, associate the second data with a policy for backing up a particular type of data, and initiate a transfer of one or more copies of the second data to a second one or more storage medias defined by the policy.

11. The system of claim 10, wherein the one or more processors are further operable, upon execution of the instructions, to:

receive information about the policy;

receive first information about the first data;

determine that the first data is included in the particular type of data;

based on the determination about the first data, associate the first data with the policy; and initiate a transfer of one or more copies of the first data to a first one or more storage medias defined by the policy.

12. The system of claim 10, wherein the one or more processors are further operable, upon execution of the instructions, to:

based on the determination about the first data, associate the first device with the policy; and based on the determination about the second data, associate the second device with the policy.

13. The system of claim 11, wherein the first one or more storage medias are the same as the second one or more storage medias.

14. The system of claim 10, wherein the one or more processors are further operable, upon execution of the instructions, to determine that the first data and the second data comprise the same type of data.

15. The system of claim 11, wherein the one or more processors are further operable, upon execution of the instructions, to:

receive the first information from a first agent installed on the first device; and receive the second information from a second agent installed on the second device.

16. The system of claim 11, wherein the first information comprises a copy of first metadata from the first data; and wherein the second information comprises a copy of second metadata from the second data.

17. The system of claim 11, wherein the one or more processors are further operable, upon execution of the instructions, to:

receive the one or more copies of the first data and subsequently transfer the one or more copies of the first data to the first one or more storage medias; and receive the one or more copies of the second data and subsequently transfer the one or more copies of the second data to the second one or more storage medias.

18. The system of claim 11, wherein the one or more processors are further operable, upon execution of the instructions, to:

based on the information about the policy, initiate a removal of at least one of the one or more copies of the first data from at least one of the first one or more storage medias after a first predetermined amount of time; and based on the information about the policy, initiate a removal of at least one of the one or more copies of the second data from at least one of the second one or more storage medias after a second predetermined amount of time.

19. One or more non-transitory tangible storage medias comprising logic, the logic operable, upon execution, to:
- receive second information about second data stored on a second device;
- determine that the second data is associated with first data stored on a first device;
- based on the determination about the second data, associate the second data with a policy for backing up a particular type of data, and
- initiate a transfer of one or more copies of the second data to a second one or more storage medias defined by the policy.

20. The one or more non-transitory tangible storage medias of claim 19, wherein the logic is further operable, upon execution, to:
- receive information about the policy;
- receive first information about the first data;
- determine that the first data is included in the particular type of data;
- based on the determination about the first data, associate the first data with the policy; and
- initiate a transfer of one or more copies of the first data to a first one or more storage medias defined by the policy.

21. The one or more non-transitory tangible storage medias of claim 20, wherein the logic is further operable, upon execution, to:
- based on the determination about the first data, associate the first device with the policy; and
- based on the determination about the second data, associate the second device with the policy.

22. The one or more non-transitory tangible storage medias of claim 19, wherein the logic is further operable, upon execution, to determine that the first data and the second data comprise the same type of data.

23. The one or more non-transitory tangible storage medias of claim 20, wherein the logic is further operable, upon execution, to:
- receive the first information from a first agent installed on the first device; and
- receive the second information from a second agent installed on the second device.

24. The one or more non-transitory tangible storage medias of claim 20, wherein the logic is further operable, upon execution, to:
- receive the one or more copies of the first data and subsequently transfer the one or more copies of the first data to the first one or more storage medias; and
- receive the one or more copies of the second data and subsequently transfer the one or more copies of the second data to the second one or more storage medias.

25. The one or more non-transitory tangible storage medias of claim 20, wherein the logic is further operable, upon execution, to:
- based on the information about the policy, initiate a removal of at least one of the one or more copies of the first data from at least one of the first one or more storage medias after a first predetermined amount of time; and
- based on the information about the policy, initiate a removal of at least one of the one or more copies of the second data from at least one of the second one or more storage medias after a second predetermined amount of time.

* * * * *